(12) United States Patent
Lahoda et al.

(10) Patent No.: US 10,060,018 B2
(45) Date of Patent: Aug. 28, 2018

(54) KINETICALLY APPLIED GRADATED ZR-AL-C CERAMIC OR TI-AL-C CERAMIC OR AMORPHOUS OR SEMI-AMORPHOUS STAINLESS STEEL WITH NUCLEAR GRADE ZIRCONIUM ALLOY METAL STRUCTURE

(71) Applicant: WESTINGHOUSE ELECTRIC COMPANY LLC, Cranberry Township, PA (US)

(72) Inventors: Edward J. Lahoda, Edgewood, PA (US); Jason P. Mazzoccoli, Pittsburgh, PA (US); Peng Xu, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1460 days.

(21) Appl. No.: 14/205,799

(22) Filed: Mar. 12, 2014

(65) Prior Publication Data

US 2018/0179624 A1 Jun. 28, 2018

Related U.S. Application Data

(60) Provisional application No. 61/827,792, filed on May 28, 2013.

(51) Int. Cl.
*B05D 1/02* (2006.01)
*C23C 4/11* (2016.01)
(Continued)

(52) U.S. Cl.
CPC ............... *C23C 4/11* (2016.01); *C04B 35/48* (2013.01); *C04B 35/62222* (2013.01)

(58) Field of Classification Search
None
See application file for complete search history.

(56) References Cited

U.S. PATENT DOCUMENTS 3,427,222 A 2/1969 Biancheria et al.
5,026,517 A 6/1991 Menken et al.
(Continued)

FOREIGN PATENT DOCUMENTS

CN 1405355 A 3/2003
CN 1416964 A 5/2003
(Continued)

OTHER PUBLICATIONS

International Search Report and Written Opinion of the International Searching Authority for PCT/US2014/033932 dated Aug. 22, 2014 (Forms PCT/ISA/220, PCT/ISA/210, PCT/ISA/237).
(Continued)

*Primary Examiner* — Nathan T Leong
(74) *Attorney, Agent, or Firm* — Joseph C. Spadacene; Westinghouse Electric Company LLC

(57) ABSTRACT

A composition and method of kinetically depositing the composition to form a coating onto an exterior surface of a zirconium alloy cladding of a light water nuclear reactor which at least partially adheres to the exterior surface. The coating composition includes a first component and a second component. The first component is selected from the group consisting of zirconium, zirconium oxide and mixtures thereof. The second component is selected from the group consisting of $Zr_2AlC$ ceramic, $Ti_2AlC$ ceramic, $Ti_3AlC_2$ ceramic, $Al_2O_3$, aluminum, zirconium silicide, amorphous and semi-amorphous alloyed stainless steel, and mixtures of $Zr_2AlC$ ceramic, $Ti_2AlC$ ceramic and $Ti_3AlC_2$ ceramic. The coating has a gradient emanating from the exterior surface of the cladding toward an exposed outer surface of the coating such that percent by weight of the first component decreases and the second component increases from the exterior surface of the cladding toward the exposed outer surface of the coating.

12 Claims, 2 Drawing Sheets

(51) Int. Cl.
*C04B 35/622* (2006.01)
*C04B 35/48* (2006.01)

(56) References Cited

U.S. PATENT DOCUMENTS

| | | | |
|---|---|---|---|
| 5,075,075 | A | 12/1991 | Kapil |
| 5,171,520 | A | 12/1992 | Bryan et al. |
| 5,412,701 | A | 5/1995 | Glazman et al. |
| 6,005,906 | A | 12/1999 | Van Swam |
| 6,231,969 | B1 | 5/2001 | Knight et al. |
| 7,138,183 | B2 * | 11/2006 | Hisamatsu ............ C04B 35/481 428/446 |
| 7,139,360 | B2 | 11/2006 | Lahoda |
| 7,815,964 | B2 | 10/2010 | Lahoda et al. |
| 2013/0344348 | A1 | 12/2013 | Koo et al. |

FOREIGN PATENT DOCUMENTS

| | | |
|---|---|---|
| EP | 0614195 A1 | 9/1994 |
| EP | 2 017 852 A1 | 1/2009 |
| JP | S6166997 A | 4/1986 |
| JP | S6271801 A | 4/1987 |
| JP | 02160550 A | 6/1990 |
| JP | H02194183 A | 7/1990 |
| JP | H07120576 A | 5/1995 |
| WO | 9414164 A1 | 8/1993 |
| WO | 2014/133609 A2 | 9/2014 |

OTHER PUBLICATIONS

Mazzoccoli, Jason P., U.S. Appl. No. 13/670,808, filed Nov. 7, 2012, Deposition of Integrated Protective Material into Zirconium Cladding for Nuclear Reactors by High-Velocity Thermal Application.
European Patent Office, Extended European Search Report for European Application No. 14804608.9, dated Dec. 13, 2016.

* cited by examiner

KINETICALLY APPLIED GRADATED ZR-AL-C CERAMIC OR TI-AL-C CERAMIC OR AMORPHOUS OR SEMI-AMORPHOUS STAINLESS STEEL WITH NUCLEAR GRADE ZIRCONIUM ALLOY METAL STRUCTURE

CROSS REFERENCE TO RELATED APPLICATION

This application claims priority to U.S. Provisional Patent Application Ser. No. 61/827,792 filed May 28, 2013, entitled "A Kinetically Applied Gradated Ti—Al—C Ceramic or Amorphous or Semi-Amorphous Stainless Steel With Nuclear Grade Zirconium Alloy Metal Structure", and incorporated herein by reference.

BACKGROUND

1. Field

This invention relates to coating compositions and methods of coating zirconium alloy nuclear fuel cladding to reduce oxidation corrosion of the cladding which is exposed to light water nuclear reactor under normal or accident conditions.

2. Description of Related Art

The exposure of zirconium alloy cladding to the high temperature and pressure water environment in a nuclear reactor can result in corrosion (oxidation) of the cladding surface, and may ultimately lead to metal embrittlement. This weakening of the metal may adversely affect the performance, life-time, and safety margin of the nuclear fuel core. The inclusion of an oxidation resistant coating on the zirconium alloy cladding surface can in theory protect the zirconium alloy substrate from the reactor environment. However, there are problems associated with this solution. For example, achieving strong adherence of the coating to the zirconium alloy substrate is problematic due to a fine oxidation layer that inherently exists on top of the zirconium alloy cladding surface. FIG. 1 shows a coated zirconium alloy cladding 10 in accordance with the prior art. As shown in FIG. 1, the zirconium alloy cladding 10 has an oxidation layer 12 resulting from the immediate oxidation of the substrate 10, and a further oxidation portion 14 added as the zirconium is exposed to air, water or other oxidizing media. A coating layer 16 is applied to the oxidation portion 14. Thus, there are four distinct, separate layers that exist when the zirconium alloy cladding 10 is simply coated with the coating layer 16. Since the coating layer 16 is merely deposited on top of the oxidation layer 14, this process often results in the coating, peeling or spalling of the coating layer 16 when exposed to reactor conditions. In addition, thermal and radiation induced stresses are typically introduced in any coating during operation that can cause the coating layer 16 to peel off the zirconium alloy cladding 10.

The zirconium alloy material of which the cladding is constructed is composed of zirconium (Zr) with up to about 2 wt. % of other metals, such as niobium (Nb), tin (Sn), iron (Fe), chromium (Cr) and mixtures thereof. Such zirconium alloy cladding tubes are taught, for example, by Biancheria et al., Kapil, and Lahoda (see U.S. Pat. Nos. 3,427,222; 5,075,075; and 7,139,360 respectively). These fuel rods/cladding have an end cap at each end and a hold device such as a metal spring to keep the enclosed stack of nuclear fuel pellets in place.

Various methods of coating nuclear fuel cladding tubes are known in the art. For example, such methods are taught by Knight et al., Bryan et al., Van Swam, and Lahoda et al. (see U.S. Pat. Nos. 6,231,969; 5,171,520; 6,005,906 and 7,815,964; respectively).

Further, Mazzoccoli et al. (see U.S. patent application Ser. No. 13/670,808 filed on Nov. 7, 2012) discloses a method of coating zirconium alloy cladding tubes with an adherent mass of oxidation resistant material, using high velocity thermal application for a Zr—Al—C ceramic or Ti—Al—C ceramic or an iron based alloy, Nanosteel or Zr—Al alloy. There are disadvantages associated with this method, such as the inability of the coating to adhere to the base Zr alloy during thermal cycles.

Thus, there is a need in the art to develop a coating composition and method of depositing the composition to form a protective coating on a zirconium alloy cladding such that the coating sufficiently adheres to the cladding surface and is effective to reduce or prevent oxidation of the surface of the cladding due to its exposure to nuclear reactor coolant water.

SUMMARY

In one aspect, the above needs are met and objects accomplished by a method of depositing a coating composition onto an exterior surface of a zirconium alloy cladding of a light water nuclear reactor to form a coating which at least partially adheres to said exterior surface. The method includes providing the zirconium alloy cladding which inherently has a zirconium oxide-containing layer at least partially formed on the exterior surface with an adherent coating of a graded composition. The graded coating composition includes a first component and a second component. The first component is selected from the group consisting of zirconium, zirconium oxide and mixtures thereof. The second component is selected from the group consisting of $Zr_2AlC$ ceramic, $Ti_2AlC$ ceramic, $Ti_3AlC_2$ ceramic, $Al_2O_3$, aluminum, zirconium silicide, amorphous and semi-amorphous alloyed stainless steel, and mixtures of $Zr_2AlC$ ceramic, $Ti_2AlC$ ceramic and $Ti_3AlC_2$ ceramic. The method further includes kinetically depositing the coating composition onto the exterior surface of the cladding to form the coating. The coating has a gradient emanating from the surface of the cladding toward an exposed outer surface of the coating such that percent by weight of the first component decreases from the exterior surface of the cladding toward the exposed outer surface of the coating and percent by weight of the second component increases from the exterior surface of the cladding to the exposed outer surface of the coating, based on total weight of the coating composition.

The kinetic deposition of the coating composition can be conducted by employing a technique wherein a propellant is heated. The kinetic deposition technique may be effective to at least partially penetrate the zirconium oxide-containing layer formed on the exterior surface of the cladding. The coating may be applied by one or more passes of the kinetic deposition technique. A first pass may include depositing the coating composition to form a first layer which includes from about 75% to about 100% by weight of the first component and from about 0% to about 25% by weight of the second component based on total weight of the coating composition. A final pass may include depositing the coating composition to form the exposed outer surface which comprises from about 75% to about 100% by weight of the second component and from about 0% to about 25% by weight of the first component based on total weight of the coating composition.

In certain embodiments, a portion of the coating composition kinetically deposited adjacent to or near the exterior surface of the cladding mixes with the zirconium oxide-containing layer to form an integrated layer.

In certain embodiments, the zirconium alloy cladding is positioned in a light water nuclear reactor selected from the group consisting of a pressurized water reactor and a boiling water reactor.

In another aspect, the invention provides a coating composition for kinetic deposition on an exterior surface of a zirconium alloy cladding of a light water nuclear reactor to form a coating which at least partially adheres to said exterior surface. The zirconium alloy cladding inherently has a zirconium oxide-containing layer at least partially formed on said exterior surface. The coating composition includes a first component and a second component. The first component is selected from the group consisting of zirconium, zirconium oxide, and mixtures thereof. The second component is selected from the group consisting of $Zr_2AlC$ ceramic, $Ti_2AlC$ ceramic, $Ti_3AlC_2$ ceramic, $Al_2O_3$, aluminum, zirconium silicide, amorphous or semi-amorphous alloyed stainless steel, and mixtures of $Zr_2AlC$ ceramic, $Ti_2AlC$ ceramic and $Ti_3AlC_2$ ceramic. The coating formed by the coating composition has a gradient emanating from the exterior surface of the cladding, which serves as the coating substrate, towards an exposed outer surface of the coating such that percent by weight of the first component decreases from the exterior surface of the cladding toward the exposed outer surface of the coating and percent by weight of the second component increases from the exterior surface of the cladding to the exposed outer surface of the coating, based on total weight percent of the coating composition.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
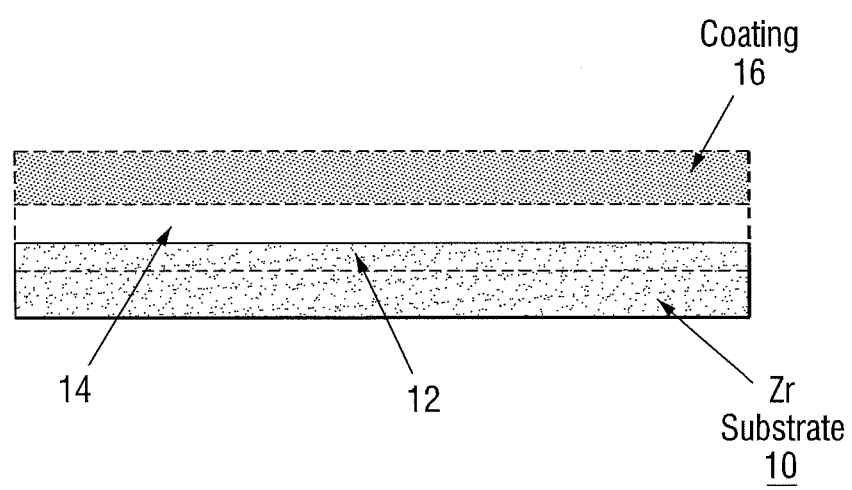
FIG. 1 is a cross-section view of a coated zirconium alloy substrate in accordance with the prior art.

The invention provides a coating composition which includes a zirconium compound and a compound which protects the cladding surface from bulk oxidation. The coating composition is deposited on an exterior surface of a zirconium alloy cladding, e.g., tube. The deposition can be performed using various conventional techniques, such as a kinetic deposition technique (referred to as "cold spray"). The zirconium alloy cladding tube typically has a zirconium-oxide layer inherently formed on at least a portion of its exterior surface. Deposition of the coating composition results in a coating being formed on at least a portion of the exterior surface of the zirconium alloy cladding tube.

The zirconium alloy cladding is positioned in the core of a light water nuclear reactor, such as a pressurized water reactor (PWR) or a boiling water reactor (BWR). Thus, the cladding is exposed to a high temperature and pressure water environment.

The coating composition of the invention includes a first component and a second component. The first component includes zirconium, zirconium oxide or mixtures thereof. The second component includes $Zr_2AlC$ ceramic, $Ti_2AlC$ ceramic, $Ti_3AlC_2$ ceramic, $Al_2O_3$, aluminum, zirconium silicide ($ZrSi_2$), amorphous or semi-amorphous alloyed stainless steel, or mixtures of $Zr_2AlC$, $Ti_2AlC$ and $Ti_3AlC_2$.

Since the zirconium alloy cladding inherently has at least partially formed on its exterior surface a zirconium oxide-containing layer or film, the coating composition is actually deposited on and adhered to this zirconium oxide-containing layer. Deposition of the coating composition of the invention results in a gradient coating or matrix that emanates from the exterior surface of the zirconium alloy cladding to an outer exposed surface of the coating. This gradient coating is effective to eliminate bulk oxidation of the zirconium alloy cladding upon exposure to PWR or BWR conditions, e.g., coolant that circulates in the reactor core. The gradient of the coating is such that the amount or weight percent (based on total weight of the coating composition) of each of the first and second components increases or decreases as the coating thickness emanates from the surface of the coating which is adjacent to or near the zirconium alloy cladding surface toward the exposed outer surface of the coating. In certain embodiments, the amount of the first component decreases as the coating thickness emanates from the surface adjacent to or near the zirconium alloy cladding surface toward the exposed outer coating surface, and the amount of the second component increases as the coating thickness emanates from the surface adjacent to or near the zirconium alloy cladding surface toward the exposed outer coating surface. Further, the decrease in the amount of the first component may correspond to the increase in the amount of the second component. For example, when the weight percent of the first component decreases from about 75% by weight at the surface of the coating adjacent to or near the cladding surface to about 10% by weight at the exposed outer surface, the weight percent of the second component correspondingly increases from about 25% by weight at the surface of the coating adjacent to or near the cladding surface to about 90% by weight at the exposed outer surface of the coating. In certain embodiments, the weight percent of each of the first and second components may decrease and increase, respectively, such that the first component is present on the exposed outer surface of the coating in an amount of about 0% by weight and the second component is present on the exposed outer surface of the coating in an amount of about 100% by weight.

The coating composition may be deposited onto the exterior surface of the zirconium alloy cladding to form the gradient coating by employing various coating techniques known in the art. In certain embodiments, the coating composition is deposited using a conventional kinetic deposition technique which generally includes directing particulate material by a gas stream toward a substrate. In accordance with the invention, typically, the coating composition is propelled by a propulsive gas stream toward the zirconium alloy cladding. The first and second components of the coating composition may each be propelled separately or they may be propelled together, e.g., in a blend or mixture. The coating composition may be propelled at room temperature or may be pre-heated to an elevated temperature, e.g., at or above the melting temperature of the first and second components. Without intending to be bound by any particular theory, it is believed that this method of kinetic deposition is capable of at least partially disrupting the zirconium-oxide layer which is inherently formed on the zirconium alloy cladding such that the resulting coating is firmly bonded, e.g., atom-to-atom, to the cladding surface.

The gradient coating may be formed in several passes or in a single pass. In certain embodiments wherein several passes are employed, the first pass includes an excess amount of the first component. That is, the first component is present in greater than about 50% by weight based on total weight of the coating composition. In other embodiments, the first component in the first pass may be present in about 75% by weight or greater based on total weight of the coating composition. The remainder of the coating composition being composed of the second component. In certain embodiments, the first pass includes about 100% by weight of the first component and about 0% by weight of the second component based on total weight of the coating composition. In each subsequent pass, the amount of the first component decreases and the amount of the second component increases. In certain embodiments, the amount by which the first component decreases is equal to the amount by which the second component increases.

In alternate embodiments, a single pass technique is employed. In these embodiments, the amount (e.g., percent by weight) of each of the first and second components in the coating composition is continually varied to produce the gradient coating.

The kinetic deposition methodology of the invention produces an integrated gradient coating that is richer in the first component, e.g., the zirconium or zirconium oxide, in the portion of the coating that is closer to the substrate, e.g., zirconium alloy cladding, and richer in the second component, e.g., the oxidation resistant material, in the portion of the coating that is nearer the exposed surface of the coating. In certain embodiments in accordance with the invention, the first component is present in excess (e.g., as compared to the second component) near the zirconium alloy cladding surface and the presence of the first component decreases throughout the coating thickness such that the exposed surface of the coating has an excess of the second component. Without intending to be bound by any particular theory, it is believed that the increased presence of the first component adjacent to or near the cladding tube surface enhances incorporation of the gradient coating onto and into the surface, as the coating composition is chemically similar to the zirconium alloy cladding composition and, gradually changes the thermal expansion and radiation swelling characteristics to minimize thermal and radiation stresses during operation.

In certain embodiments of the invention, the gradient coating of the invention is created by kinetically depositing a first layer of the coating composition which includes from about 50% to about 100% or from greater than about 50% to about 100% or from about 75% to about 95% by weight of the first component, and from about 0% to about 50% or from about 0% to less than about 50% or from about 5% to about 25% by weight of the second component, based on total weight of the coating composition. In certain embodiments, the first component is zirconium alloy. Subsequently, additional layers of the coating composition may be deposited on the first layer. In certain embodiments, in each of the additional layers, the amount of the first component will successively decrease and the amount of the second component will successively increase. As a result, the exposed outer surface of the coating is composed of an excess of the second component such that it retains the oxidation resistant behavior of the second component while a base is present (e.g., underlying layers) that is rich in zirconium, i.e., the first component.

The method of the invention is generally directed to depositing an oxidation resistant material into a zirconium oxide layer, such that the oxidation resistant material ultimately penetrates into the zirconium substrate resulting in strong adhesion, and the oxidation resistant material deposited on the exposed outer coating surface provides a dense oxidation resistant surface that protects the underlying substrate from the nuclear reactor environment.

Figure 2:
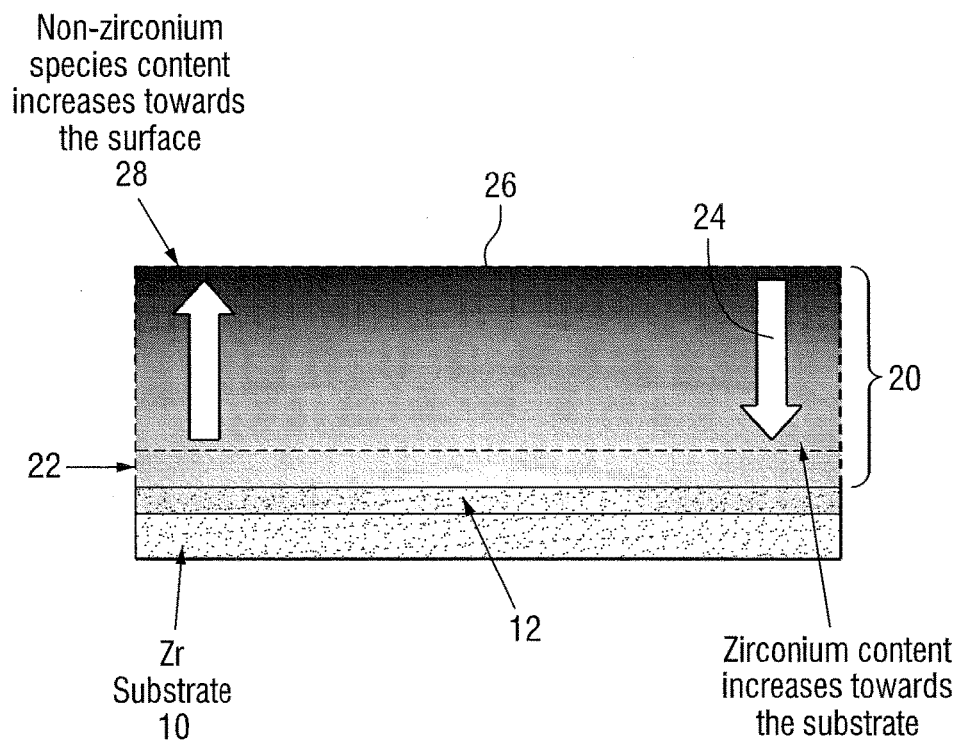
FIG. 2 is a cross-section view of a coated zirconium alloy substrate in accordance with certain embodiments of the invention.

FIG. 2 shows an integrated gradient coating deposited on a zirconium alloy substrate 10 in accordance with certain embodiments of the invention. In FIG. 2, a coating layer 20 containing zirconium alloy, e.g., the first component is applied to the zirconium alloy substrate 10. The zirconium alloy substrate 10 includes an oxidation layer 12 thereon. The coating layer 20 is adjacent to the oxidation layer 12. Within the coating layer 20 is an integration layer 22. Without intending to be bound by any particular theory, it is believed that a portion of the coating layer 20 mixes together or integrates with a portion of the oxidation layer 12, to form the integration layer 22 adjacent to the oxidation layer 12, which may penetrate within the zirconium alloy substrate 10. The zirconium (e.g., the first component) content of the coating layer 20 increases toward the zirconium alloy substrate 10 as shown by arrow 24 and the non-zirconium species (e.g., the second component) content increases toward the outside surface 26 as shown by arrow 28.

Typically, the gradient coating layer 20 is deposited and the integration layer 22 formed as a result of several passes of the kinetic deposition technique described herein. Each successive deposition increases in the non-zirconium alloy species, e.g., the second component, and decreases in zirconium alloy, e.g., the first component, content. In certain embodiments, a single pass deposition technique may be employed where the coating composition itself is altered in a continuous manner such that multiple passes are not required. The thickness of the coating layer 20 may vary and in certain embodiments is less than or equal to about 100 micrometers thick, or more preferably from about 5 to about 100 micrometers thick, or from about 5 to about 50 micrometers thick.

The higher concentration of zirconium alloy, e.g., the first component, near the base of the coating layer 20, e.g., its presence in excess as compared to the second (non-zirconium) component, and its presence in general, reduces thermal stresses incorporated by the kinetic deposition technique and in operation, reduces thermal coefficient and radiation swelling mismatches between the corrosion resistant additive, e.g., the second component, and the zirconium alloy cladding, thus increasing the propensity of the coating layer 20 to adhere to the zirconium alloy cladding 10.

The gradient coating of the invention provides numerous benefits over known corrosion resistant coatings. For example, known coatings may be applied on top of, e.g., overlay, the oxidation layer resulting in poor adhesion and failure. In the invention as shown in FIG. 2, the gradient coating provides oxidation resistant material directly into the oxidation layer which ultimately penetrates into the zirconium alloy cladding resulting in strong adhesion and a dense oxidation resistant surface that protects the underlying cladding from the reactor environment.

Figure 3:
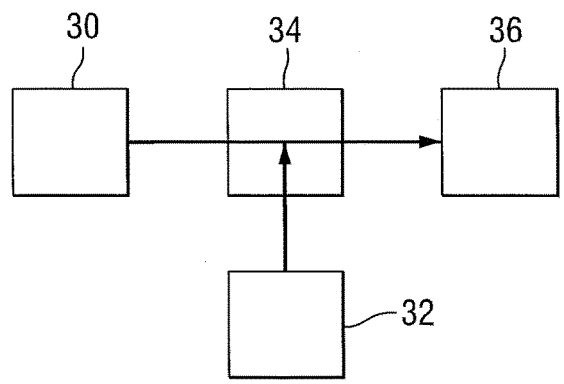
FIG. 3 is a block diagram of a method of applying a coating material employing a kinetic deposition technique in accordance with certain embodiments of the invention.

FIG. 3 shows a method of depositing a coating composition, e.g., the first and second components, in accordance with certain embodiments of this invention. A zirconium alloy tube 30 is supplied. A coating composition 32 is supplied to a Kinetic Cold Spray or Thermal Spray Deposition Process (KCS/TSDP) 34. The KCS/TSDP provides or deposits the coating composition 32 to form a gradient coating 36.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of depositing a coating composition onto an exterior surface of a zirconium alloy cladding to form a coating which at least partially adheres to said exterior surface, comprising:
    providing the zirconium alloy cladding which has an existing zirconium oxide-containing layer at least partially formed on the exterior surface;
    providing the coating composition, comprising:
        a first component selected from the group consisting of zirconium, zirconium oxide, and mixtures thereof; and
        a second component selected from the group consisting of $Zr_2AlC$ ceramic, $Ti_2AlC$ ceramic, $Ti_3AlC_2$ ceramic, $Al_2O_3$, aluminum, zirconium silicide, amorphous and semi-amorphous alloyed stainless steel, and mixtures of $Zr_2AlC$ ceramic, $Ti_2AlC$ ceramic and $Ti_3AlC_2$ ceramic; and
    kinetically depositing the coating composition onto the exterior surface of the cladding to form the coating having a gradient emanating from the exterior surface of the cladding toward an exposed outer surface of the coating such that percent by weight of the first component decreases from the exterior surface of the cladding toward the exposed outer surface of the coating and percent by weight of the second component increases from the exterior surface of the cladding to the exposed outer surface of the coating, based on total weight of the coating composition.

2. The method of claim 1, wherein the kinetically depositing the coating composition is conducted by employing a propulsive gas or other propellant.

3. The method of claim 2, wherein the propulsive gas or other propellant is heated.

4. The method of claim 1, wherein the kinetically depositing the coating composition is effective to at least partially penetrate the zirconium oxide-containing layer.

5. The method of claim 1, wherein the kinetically depositing the coating composition includes one or more passes to form the coating.

6. The method of claim 5, wherein a first pass of the kinetically depositing the coating composition forms a first layer which comprises from about 75% to about 100% by weight of the first component and from about 0% to about 25% by weight of the second component based on total weight of the coating composition.

7. The method of claim 5, wherein a final pass of the kinetically depositing the coating composition forms the exposed outer surface which comprises from about 75% to about 100% by weight of the second component and from about 0% to about 25% by weight of the first component based on total weight of the coating composition.

8. The method of claim 1, wherein a portion of the coating composition is kinetically deposited adjacent to or near the exterior surface and mixes with the zirconium oxide-containing layer to form an integrated layer.

9. The method of claim 1, wherein the zirconium alloy cladding is positioned in a nuclear reactor selected from the group consisting of a pressurized water reactor and a boiling water reactor.

10. The method of claim 1, wherein the coating is from about 5 to about 100 micrometers in thickness.

11. The method of claim 1, wherein the coating is from about 5 to about 50 micrometers in thickness.

12. A method of depositing a coating composition onto a zirconium alloy cladding to form a coating, comprising:
    providing the zirconium alloy cladding having an existing zirconium oxide-containing layer at least partially formed on an exterior surface of the cladding;
    providing the coating composition, comprising:
        a first component selected from the group consisting of zirconium, zirconium oxide, and mixtures thereof; and
        a second component selected from the group consisting of $Zr_2AlC$ ceramic, $Ti_2AlC$ ceramic, $Ti_3AlC_2$ ceramic, $Al_2O_3$, aluminum, zirconium silicide, amorphous and semi-amorphous alloyed stainless steel, and mixtures of $Zr_2AlC$ ceramic, $Ti_2AlC$ ceramic and $Ti_3AlC_2$ ceramic; and
    kinetically depositing the coating composition onto the zirconium oxide-containing layer on the exterior surface of the cladding, wherein an amount of the first component and an amount of the second component in the coating composition are varied during this depositing step, such that the first component initially constitutes an excess by weight and there is a remainder of the second component based on total weight of the coating composition, and subsequently during this depositing step, the amount of the first component successively decreases and the amount of the second component successively increases in the coating composition to form the coating having a gradient, such that as a thickness of the coating emanates from the exterior surface of the cladding toward an exposed outer surface of the coating, percent by weight of the first component decreases from the exterior surface of the cladding toward the exposed outer surface of the coating and percent by weight of the second component increases from the exterior surface of the cladding to the exposed outer surface of the coating, such that the second component constitutes an excess by weight in the exposed outer surface.

* * * * *